United States Patent
Itaya et al.

(10) Patent No.: US 8,964,638 B2
(45) Date of Patent: Feb. 24, 2015

(54) WIRELESS COMMUNICATION DEVICE, WIRELESS COMMUNICATION SYSTEM, PROGRAM, AND WIRELESS COMMUNICATION METHOD

(75) Inventors: Natsuki Itaya, Tokyo (JP); Masahiko Naito, Tokyo (JP); Erika Saito, Tokyo (JP); Tomoya Yamaura, Tokyo (JP); Hideyuki Suzuki, Tokyo (JP); Katsutoshi Itoh, Tokyo (JP)

(73) Assignee: Sony Corporation, Tokyo (JP)

( * ) Notice: Subject to any disclaimer, the term of this patent is extended or adjusted under 35 U.S.C. 154(b) by 573 days.

(21) Appl. No.: 13/018,610

(22) Filed: Feb. 1, 2011

(65) Prior Publication Data

US 2011/0194489 A1 Aug. 11, 2011

(30) Foreign Application Priority Data

Feb. 9, 2010 (JP) ................................. 2010-026430

(51) Int. Cl.
*H04W 4/00* (2009.01)
*H04B 7/216* (2006.01)
*H04L 12/28* (2006.01)
*H04W 28/14* (2009.01)
*H04L 12/861* (2013.01)
*H04W 28/06* (2009.01)
*H04W 72/12* (2009.01)

(52) U.S. Cl.
CPC ............... *H04W 28/14* (2013.01); *H04L 49/90* (2013.01); *H04W 28/06* (2013.01); *H04W 72/1278* (2013.01)

USPC .......... 370/328; 370/335; 370/338; 370/342; 370/397; 370/441

(58) Field of Classification Search
None
See application file for complete search history.

(56) References Cited

U.S. PATENT DOCUMENTS

| 6,728,792 | B2 * | 4/2004 | Wagner ............................. 710/6 |
| 2006/0002354 | A1 * | 1/2006 | Kang et al. ..................... 370/338 |
| 2006/0193315 | A1 * | 8/2006 | Sinivaara et al. ............. 370/389 |
| 2007/0083897 | A1 * | 4/2007 | Brownell ......................... 725/61 |
| 2008/0045181 | A1 * | 2/2008 | Suzuki ........................... 455/411 |
| 2008/0298375 | A1 * | 12/2008 | Agardh et al. ................ 370/397 |
| 2009/0024730 | A1 * | 1/2009 | Wu .............................. 709/223 |
| 2009/0037306 | A1 * | 2/2009 | Hill ................................ 705/35 |
| 2010/0179994 | A1 * | 7/2010 | Bittles et al. .................. 709/206 |

FOREIGN PATENT DOCUMENTS

JP 2008-283590 A 11/2008

* cited by examiner

*Primary Examiner* — Melanie Jagannathan
(74) *Attorney, Agent, or Firm* — Sony Corporation

(57) ABSTRACT

Provided is a wireless communication device including a receiving unit that receives, from one or more than one first wireless communication devices, information indicating an order of each of the one or more than one first wireless communication devices in a queue for data communication with a second wireless communication device, an order management unit that manages an order of its own device in the queue based on the information received by the receiving unit from the one or more than one first wireless communication devices, and a transmitting unit that transmits information indicating the order of its own device in the queue managed by the order management unit.

18 Claims, 10 Drawing Sheets

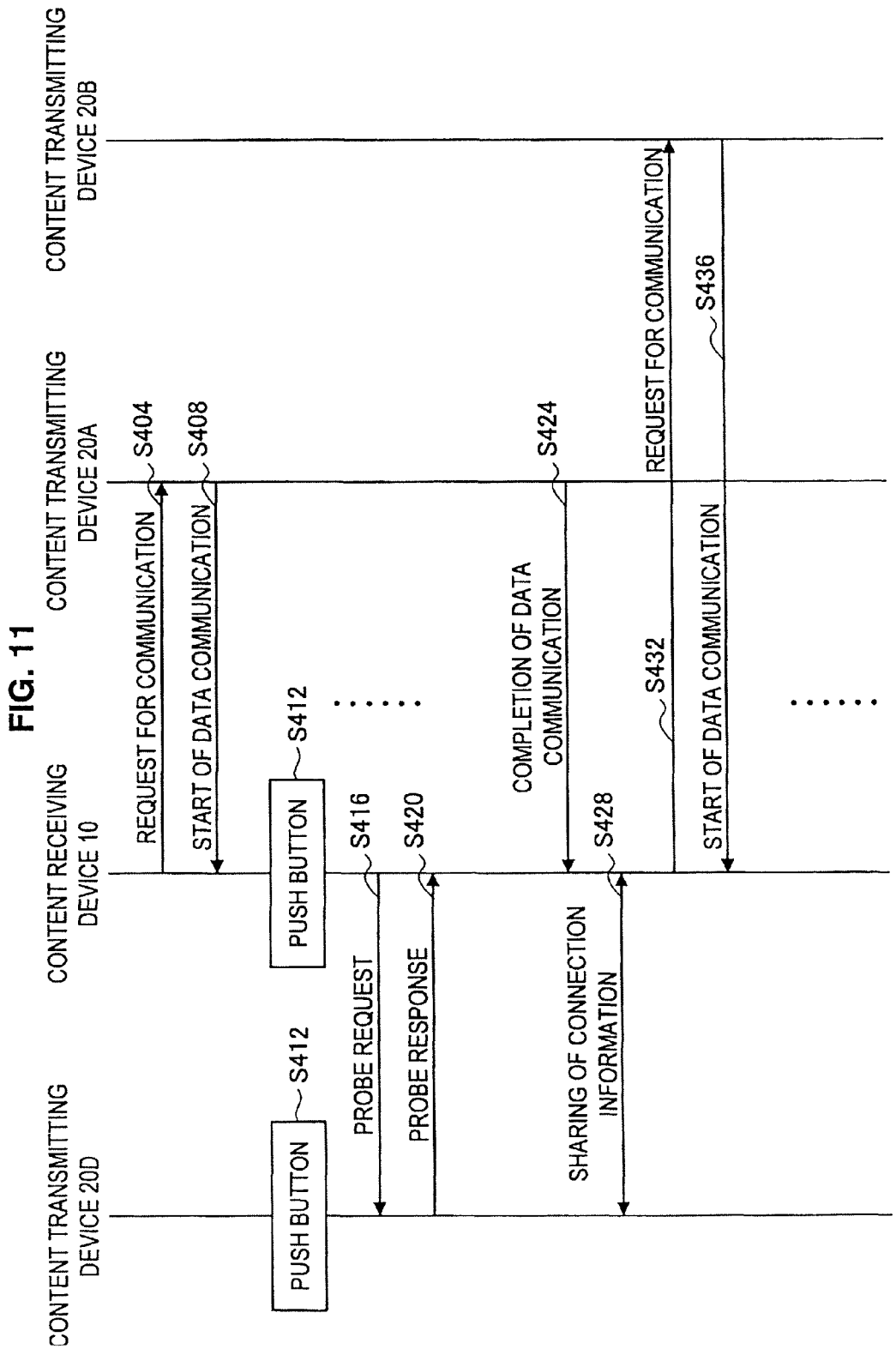

WIRELESS COMMUNICATION DEVICE, WIRELESS COMMUNICATION SYSTEM, PROGRAM, AND WIRELESS COMMUNICATION METHOD

BACKGROUND OF THE INVENTION

1. Field of the Invention

The present invention relates to a wireless communication device, a wireless communication system, a program, and a wireless communication method.

2. Description of the Related Art

A wireless LAN (Local Area Network) system as typified by IEEE (Institute of Electrical and Electronics Engineers) 802.11 is becoming increasingly common in place of a wired network for its advantages such as high flexibility of equipment. As described in Japanese Unexamined Patent Publication No. 2008-283590, for example, a wireless LAN system standardized by the IEEE 802.11 is composed of a group of wireless communication devices including an access point operating as a master unit and a plurality of stations operating as slave units, and a plurality of stations are connected to one access point.

Further, according to Wi-Fi Direct under Wi-Fi Alliance standard development, it is proposed to form a communication group by determining which of a group owner and a client each of a plurality of wireless communication devices acts as. The group owner operates as a simplified access point and has a function to connect one or two or more clients.

With use of wireless access schemes such as the wireless LAN and the Wi-Fi Direct, a wireless communication system in which a given wireless communication device makes connection to a plurality of wireless communication devices in turn and performs data communication can be implemented. To be specific, a speaker having a wireless function can make connection to a plurality of content transmitting devices in turn and output content data sequentially received from the plurality of content transmitting devices.

Generally, in such a wireless communication system, a given wireless communication device manages a queue of a plurality of wireless communication devices, and a wireless communication device in want of data communication accesses the given wireless communication device and adds itself to the queue, waits for the order of itself and then starts data communication with the given wireless communication device.

SUMMARY OF THE INVENTION

However, in order to add a new wireless communication device to the queue managed by the given wireless communication device, it is necessary that the given wireless communication device and the new wireless communication device communicate with each other. Therefore, there has been a concern that, during a period when the given wireless communication device performs data communication with another wireless communication device, it is difficult to add the new wireless communication device to the queue.

In light of the foregoing, it is desirable to provide novel and improved wireless communication device, wireless communication system, program, and wireless communication method that enable data communication and enqueuing to be performed concurrently.

According to an embodiment of the present invention, there is provided A wireless communication device including a receiving unit that receives, from one or more than one first wireless communication devices, information indicating an order of each of the one or more than one first wireless communication devices in a queue for data communication with a second wireless communication device, an order management unit that manages an order of its own device in the queue based on the information received by the receiving unit from the one or more than one first wireless communication devices, and a transmitting unit that transmits information indicating the order of its own device in the queue managed by the order management unit.

When adding its own device to the queue, the order management unit may set the order of its own device to an order next to an order at an end of the queue.

When a plurality of orders are managed by the order management unit as the order of its own device in the queue, the transmitting unit may transmit information indicating a first order and a last order among the plurality of orders.

The wireless communication device may start data communication with the second wireless communication device when the order of its own device in the queue reaches a front of the queue.

The information indicating the order of its own device in the queue may be contained in an annunciation signal transmitted periodically.

The transmitting unit may transmit the annunciation signal at an interval according to the order of its own device in the queue.

The transmitting unit may transmit the information indicating the order of its own device in the queue through a wireless channel different from a wireless channel for data communication with the second wireless communication device.

The transmitting unit may transmit the information indicating the order of its own device in the queue in response to a request from another wireless communication device.

According to another embodiment of the present invention, there is provided a wireless communication device including a receiving unit that receives, from one or more than one nearby wireless communication devices, information indicating an order of each of the one or more than one nearby wireless communication devices in a queue for data communication with the wireless communication device. The wireless communication device starts data communication with a nearby wireless communication device having an order at a front of the queue among the one or more than one nearby wireless communication devices based on the information received by the receiving unit.

According to another embodiment of the present invention, there is provided a wireless communication system including one or more than one first wireless communication devices, and a second wireless communication device. Each of the first wireless communication devices includes a receiving unit that receives, from other first wireless communication devices, information indicating an order of each of the other first wireless communication devices in a queue for data communication with the second wireless communication device, an order management unit that manages an order of its own device in the queue based on the information received by the receiving unit from the other first wireless communication devices, and a transmitting unit that transmits information indicating the order of its own device in the queue managed by the order management unit, and the second wireless communication device starts data communication with a first wireless communication device having an order at a front of the queue among the one or more than one nearby wireless communication devices based on the information received from the one or more than one first wireless communication devices.

The second wireless communication device may execute exchange of connection information with a new wireless communication device upon switching of the first wireless communication device to perform data communication with.

According to another embodiment of the present invention, there is provided a program causing a computer to function as a wireless communication device including, a receiving unit that receives, from one or more than one first wireless communication devices, information indicating an order of each of the one or more than one first wireless communication devices in a queue for data communication with a second wireless communication device, an order management unit that manages an order of its own device in the queue based on the information received by the receiving unit from the one or more than one first wireless communication devices, and a transmitting unit that transmits information indicating the order of its own device in the queue managed by the order management unit.

According to another embodiment of the present invention, there is provided a wireless communication method including steps of receiving, from one or more than one first wireless communication devices, information indicating an order of each of the one or more than one first wireless communication devices in a queue for data communication with a second wireless communication device, managing an order of its own device in the queue based on the information received from the one or more than one first wireless communication devices, and transmitting information indicating the order of its own device in the queue.

According to the embodiments of the present invention described above, data communication and enqueuing can be performed concurrently.

BRIEF DESCRIPTION OF THE DRAWINGS

FIG. 11 is a sequence chart showing a method of sharing connection information.

DETAILED DESCRIPTION OF THE EMBODIMENT(S)

Figure 1:
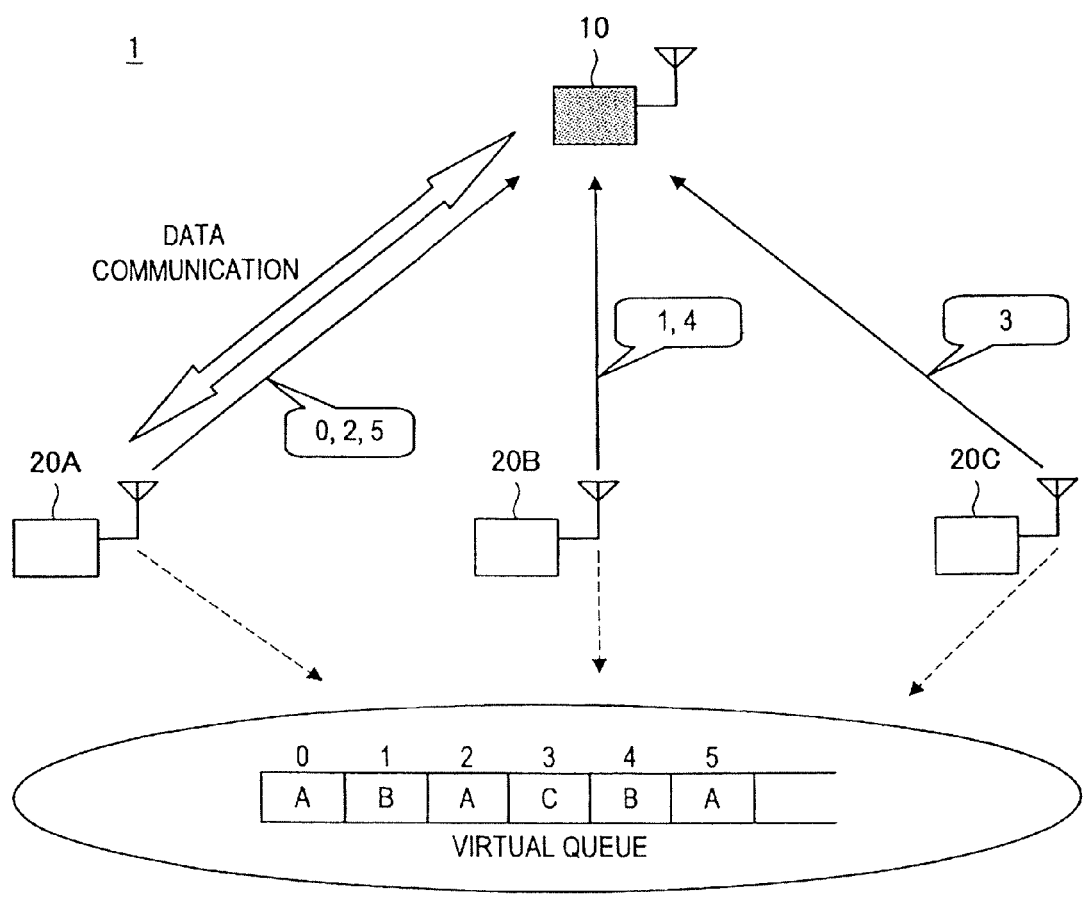
FIG. 1 is an explanatory view showing a configuration of a wireless communication system according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

In this specification and the drawings, each of a plurality of structural elements having substantially the same function is distinguished by affixing a different alphabetical letter to the same reference numeral in some cases. For example, a plurality of structural elements having substantially the same function are distinguished like content transmitting devices 20A, 20B and 20C where necessary. However, when there is no particular need to distinguish between a plurality of structural elements having substantially the same function, they are denoted only by the same reference numeral. For example, when there is no particular need to distinguish between the content transmitting devices 20A, 20B and 20C, they are referred to simply as the content transmitting device 20.

Preferred embodiments of the present invention will be described hereinafter in the following order.
 1. Configuration of Wireless Communication System
 2. Configuration of Content Transmitting Device
 3. Operation of Content Transmitting Device
 4. Configuration of Content Receiving Device
 5. Exchange of Connection Information
 6. Summary <1. Configuration of Wireless Communication System>

A configuration of a wireless communication system 1 according to an embodiment of the present invention is described firstly with reference to FIG. 1.

FIG. 1 is an explanatory view showing a configuration of a wireless communication system 1 according to an embodiment of the present invention. Referring to FIG. 1, the wireless communication system 1 according to the embodiment of the present invention includes content transmitting devices 20A to 20C and a content receiving device 10.

Each of the content transmitting devices 20A to 20C (first wireless communication devices) is placed in a queue for data communication with the content receiving device 10 (second wireless communication device) and performs data communication with the content receiving device 10 according to the order in the queue.

Specifically, each of the content transmitting devices 20A to 20C is placed into the queue by transmitting information indicating a queuing number of its own device. For example, as shown in FIG. 1, the content transmitting device 20A transmits information indicating the queuing numbers "0, 2, 5", the content transmitting device 20B transmits information indicating the queuing numbers "1, 4" and the content transmitting device 20C transmits information indicating the queuing number "3". Thus, as a queue for data communication with the content receiving device 10, the virtual queue as shown at bottom of FIG. 1 is created.

Then, the content receiving device 10 receives the information transmitted from the content transmitting devices 20A to 20C, selects the content transmitting device 20 with the queuing number at the front of the queue, and performs data communication with the selected content transmitting device 20. In the example shown in FIG. 1, because the content transmitting device 20A with the queuing number "0" is at the front of the queue, the content receiving device 10 performs data communication with the content transmitting device 20A. For example, the content receiving device 10 receives music data from the content transmitting device 20A and outputs the received music data from a speaker.

Further, the content transmitting device 20 which asks for addition to the queue receives information indicating queuing numbers transmitted from the content transmitting devices 20 in the vicinity, sets a number next to the queuing number at the end as the queuing number of itself, and transmits information indicating the queuing number. The content transmitting device 20 can thereby adds itself to the virtual queue for data communication with the content receiving device 10.

For example, when the content transmitting device 20C asks for addition to the queue in the example shown in FIG. 1, because the number at the end of the queue is "5", the content transmitting device 20C sets "6", which is the number next to "5", as the queuing number of itself, transmits information indicating the queuing number "6", and thereby adds itself to the queue.

Note that a wireless standard used by the content transmitting device 20 and the content receiving device 10 is not particularly limited. For example, the content transmitting device 20 and the content receiving device 10 may use the wireless standard specified by IEEE (Institute of Electrical and Electronics Engineers) 802.11a, b, g, n or the like, and, in this case, the content transmitting device 20 may act as an access point, and the content receiving device 10 may act as a station. Further, the content transmitting device 20 and the content receiving device 10 perform communication not in infrastructure mode but in ad-hoc mode.

Further, the content transmitting device 20 and the content receiving device 10 may confirm to the Wi-Fi Direct, and, in this case, the content transmitting device 20 may act as a group owner, and the content receiving device 10 may act as a client.

Further, content data which is transmitted when the content transmitting device 20 performs data communication with the content receiving device 10 is not particularly limited. For example, the content data may be music data such as music, lecture or radio program, video data such as movie, television program, video program, photograph, document, picture or chart, game, software or the like.

Furthermore, one-way transmission of content data described above is just an example of data communication, and the data communication may be one-way or two-way communication for arbitrary service exchange.

In addition, a hardware type of the content transmitting device 20 and the content receiving device 10 is also not particularly limited. For example, the hardware type may be an information processing device such as a PC (Personal Computer), a home video processing device (e.g. display, DVD recorder, videocassette recorder etc.), a PDA (Personal Digital Assistants), a home game device, or an electrical household appliance. Further, the hardware type may be an information processing device such as a mobile phone, a PHS (Personal Handyphone System), a portable music player, a portable video processing device, or a portable game device. Furthermore, the content transmitting device 20 may be an access point, and the content receiving device 10 may be a music output device with a speaker function.

As described above, in the wireless communication system 1 according to the embodiment of the present invention, each of the content transmitting devices 20A to 20C transmits information indicating the queuing numbers of themselves and thereby creates a virtual queue for data communication with the content receiving device 10. An advantage of employing the configuration of the wireless communication system 1 is described hereinafter in comparison with the case of managing a queue by a single device in a centralized manner.

Figure 2:
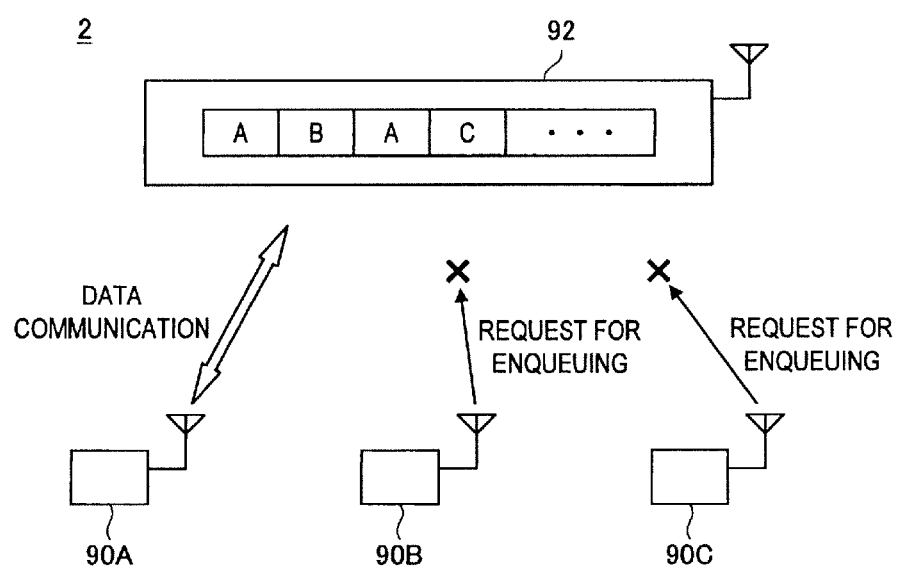
FIG. 2 is an explanatory view showing a configuration of a wireless communication system according to a comparative example.

FIG. 2 is an explanatory view showing a configuration of a wireless communication system 2 according to a comparative example. In the wireless communication system 2 according to the comparative example, a content receiving device 92 makes centralized management of a queue, and a content transmitting device 90 which asks for addition to the queue needs to perform communication with the content receiving device 92 to make a request for addition to the queue.

Therefore, when the content receiving device 92 is performing data communication with a content transmitting device 90A placed at the front of the queue, in order to add a content transmitting device 90B or 90C to the queue, it is necessary to interrupt the data communication between the content receiving device 92 and the content transmitting device 90A or wait for completion of the data communication between the content receiving device 92 and the content transmitting device 90A.

On the other hand, in the wireless communication system 1 according to the embodiment of the present invention, each of the content transmitting devices 20A to 20C identifies the queuing numbers of themselves and transmits information indicating their respective queuing numbers to thereby add themselves to the queue. Thus, in the wireless communication system 1 according to the embodiment of the present invention, it is not necessary for the content transmitting device 20 to perform communication with the content receiving device 10 at the time of adding itself to the queue, and therefore a new entry can be added to the queue without depending on the communication status of the content receiving device 10.

Specifically, the wireless communication system 1 according to the embodiment of the present invention can add a new entry to the queue without interrupting data communication of the content receiving device 10 and without waiting for completion of data communication of the content receiving device 10. The content transmitting device 20 and the content receiving device 10 that constitute the wireless communication system 1 having such a configuration are described hereinafter in detail.

<2. Configuration of Content Transmitting Device>

First, a hardware configuration of the content transmitting device 20 is described with reference to FIG. 3.

Figure 3:
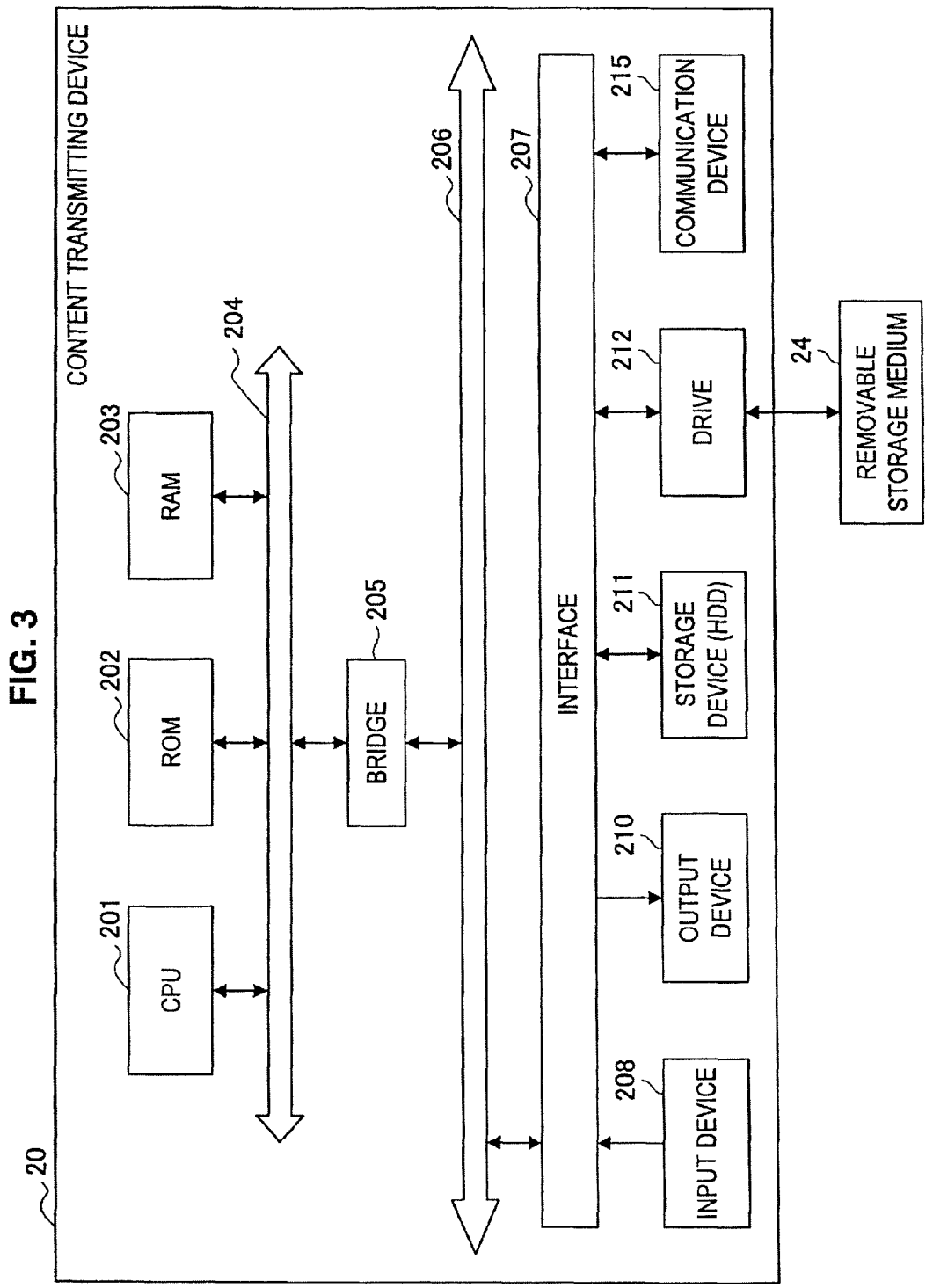
FIG. 3 is a block diagram showing a hardware configuration of a content transmitting device.

FIG. 3 is a block diagram showing a hardware configuration of the content transmitting device 20. The content transmitting device 20 includes a CPU (Central Processing Unit) 201, a ROM (Read Only Memory) 202, a RAM (Random Access Memory) 203, and a host bus 204. The content transmitting device 20 further includes a bridge 205, an external bus 206, an interface 207, an input device 208, an output device 210, a storage device (HDD) 211, a drive 212, and a communication device 215.

The CPU 201 serves as a processing device and a control device, and it controls the overall operations in the content transmitting device 20 according to various kinds of programs. The CPU 201 may be a microprocessor. The ROM 202 stores a program to be used by the CPU 201, a processing parameter and so on. The RAM 203 temporarily stores a program to be used in the execution on the CPU 201, a parameter that varies in the execution and so on. The CPU 201, the ROM 202 and the RAM 203 are connected through the host bus 204, which may be a CPU bus or the like.

The host bus 204 is connected to the external bus 206 such as a PCI (Peripheral Component Interconnect/Interface) bus via the bridge 205. Note that the host bus 204, the bridge 205 and the external bus 206 are not necessarily separated from one another, and their functions may be implemented by one bus.

The input device 208 may include an input means for a user to input information, such as a mouse, a keyboard, a touch panel, a button, a microphone, a switch, or a lever, and an input control circuit that generates an input signal based on a user input and outputs it to the CPU 201, for example. A user of the content transmitting device 20 manipulates the input device 208 to thereby input various kinds of data or direct a processing operation to the content transmitting device 20.

The output device 210 includes a display device such as a CRT (Cathode Ray Tube) display device, an LCD (Liquid Crystal Display) device, an OLED (Organic Light Emitting Display) device or a lamp. Further, the output device 210 includes a sound output device such as a speaker or a headphone. The output device 210 outputs reproduced contents, for example. Specifically, the display device displays various kinds of information such as reproduced video data by texts or images. On the other hand, the sound output device converts reproduced sound data or the like into sound and outputs the sound.

The storage device 211 is a device for data storage that is configured as an example of a storage unit of the content transmitting device 20 according to the embodiment. The storage device 211 may include a storage medium, a recording device that records data into the storage medium, a reading device that reads data from the storage medium, a deleting device that deletes data recorded in the storage medium or the like. The storage device 211 may be an HDD (Hard Disc Drive), for example. The storage device 211 drives a hard disk and stores a program to be executed by the CPU 201 or various data.

The drive 212 is a reader/writer for a storage medium, and it may be built in the content transmitting device 20 or attached externally. The drive 212 reads information that is recorded on a removable storage medium 24 such as a magnetic disk, an optical disk, a magneto-optical disk or a semiconductor memory which is attached thereto and outputs the information to the RAM 203. Further, the drive 212 may write information into the removable storage medium 24.

The communication device 215 is a communication interface that includes a communication device or the like to establish connection with the wireless communication devices in the vicinity, for example. The communication device 215 may be a communication device compatible with a wireless LAN (Local Area Network), a communication device compatible with LTE (Long Term Evolution), or a wired communication device that performs wired communication.

The hardware configuration of the content transmitting device 20 is described above with reference to FIG. 3. A hardware configuration of the content receiving device 10 may be substantially the same as that of the content transmitting device 20, and explanation thereof is omitted.

Next, functions of the content transmitting device 20 are described hereinafter with reference to FIG. 4.

Figure 4:
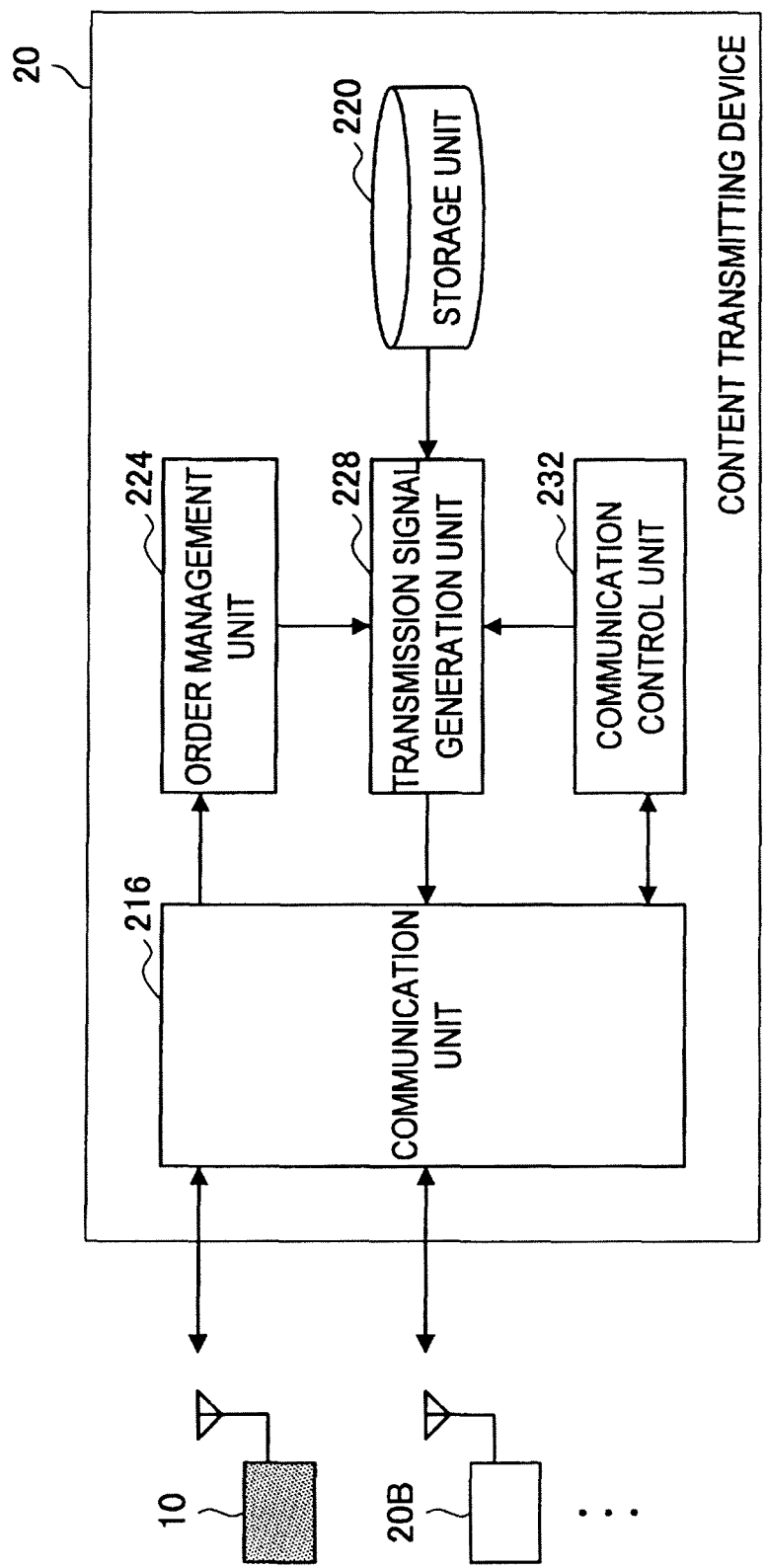
FIG. 4 is a functional block diagram showing a configuration of a content transmitting device.

FIG. 4 is a functional block diagram showing the configuration of the content transmitting device 20. Referring to FIG. 4, the content transmitting device 20 includes a communication unit 216, a storage unit 220, an order management unit 224, a transmission signal generation unit 228, and a communication control unit 232.

The communication unit 216 is an interface with external wireless communication devices. The communication unit 216 has a function of a receiving unit that receives information indicating a queuing number from the content transmitting device 20B or the like in the vicinity and a function of a transmitting unit that transmits information indicating the queuing number of its own device which is generated by the transmission signal generation unit 228. Further, the communication unit 216 transmits content data to the content receiving device 10 by streaming, for example.

The storage unit 220 is a storage medium that stores content data. The storage unit 220 may be a storage medium such as a nonvolatile memory, a magnetic disk, an optical disc or an MO (Magneto Optical) disk. Examples of the nonvolatile memory are EEPROM (Electrically Erasable Programmable Read-Only Memory), EPROM (Erasable Programmable ROM) and so on. Examples of the magnetic disk are a hard disk, a discoid magnetic disk and so on. Examples of the optical disc are CD (Compact Disc), DVD-R (Digital Versatile Disc Recordable), BD (Blu-ray Disc (registered trademark)) and so on.

(Order Management Unit 224)

The order management unit 224 manages the queuing number of its own device in the queue for data communication with the content receiving device 10. For example, when adding its own device to the queue, the order management unit 224 refers to the queuing numbers of other content transmitting devices received by the communication unit 216 and sets a number next to the queuing number at the end as the queuing number of its own device.

The queuing number at the front may be expressed as "n", the second queuing number as "n+k", the third queuing number as "n+2·k", and the x-th queuing number as "n+(x−1)·k". For example, when the end of the queue is the x-th order "n+(x−1)·k", the order management unit 224 sets the queuing number of its own device to "n+x·k". The queuing number in the queue shown in FIG. 1 is expressed by n=0 and k=1.

Further, the order management unit 224 updates the queuing number of its own device according to need. The update of the queuing number is described specifically with reference to FIG. 5.

Figure 5:
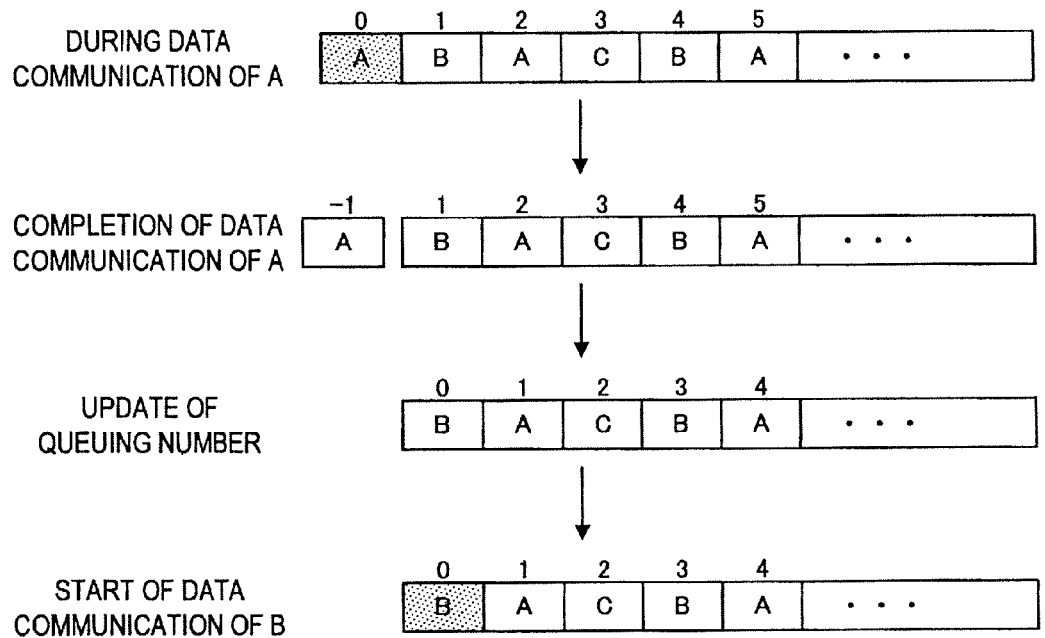
FIG. 5 is an explanatory view showing a specific example of update of queuing numbers.

FIG. 5 is an explanatory view showing a specific example of update of queuing numbers. As shown in FIG. 5, the order management unit 224 of the content transmitting device 20A which is placed at the front of the queue and performing data communication updates the queuing number of its own device to "−1", which is "n−k", upon completion of the data communication. Then, when the order management units 224 of the other content transmitting devices 20 detect that the queuing number of the content transmitting device 20A has been updated to "−1", which is "n−k", they update the queuing numbers of their devices with "−k" and thereby advance the order by one. As a result, the queuing number of the content transmitting device 20B becomes "0", which is the front of the queue, and therefore the content transmitting device 20B starts data communication with the content receiving device 10.

Note that the content transmitting device 20A may continue the transmission of the information indicating the queuing number "−1" until the update of the queuing numbers of the other content transmitting devices 20 is completed (for example, until the content transmitting device that transmits information indicating "0" appears).

Further, although the case where the queuing number is set to "−1", which is "n−k", at completion of data communication is described above, the content transmitting device 20 may end the transmission of the queuing number at the same time as the completion of data communication. In this case, the order management units 224 of the other content transmitting devices 20 may update the queuing numbers of their devices based on that the transmission of the queuing number "n" has ended.

Alternatively, the order management units 224 of the other content transmitting devices 20 may update the queuing numbers of their devices with "−k" and thereby advance the order by one when the immediately preceding queuing number of their respective devices ceases to be detected. In this method, the queuing numbers are updated one by one, so that the content transmitting device 20B with the queuing number "n+k" updates the queuing number to "n", and the content transmitting device 20A with the queuing number "n+2·k" updates the queuing number to "n+k".

Further, although the method that updates the queuing number based on completion of data communication of the content transmitting device 20 is descried above, the above-described update method may be applied also to the case where the content transmitting device 20 is removed from the queue.

Furthermore, although the case where the content transmitting device 20 updates the queuing number and the content receiving device 10 performs data communication with the content transmitting device 20 with the queuing number "0" is descried above, the present invention is not limited to such an example. For example, the content transmitting device 20 may not update the queuing number, and the content receiving device 10 may change the queuing number of the content transmitting device 20 to be selected as the device to communicate with to "n", "n+k", "n+2·k" and so on at each completion of the data communication.

Figure 6:
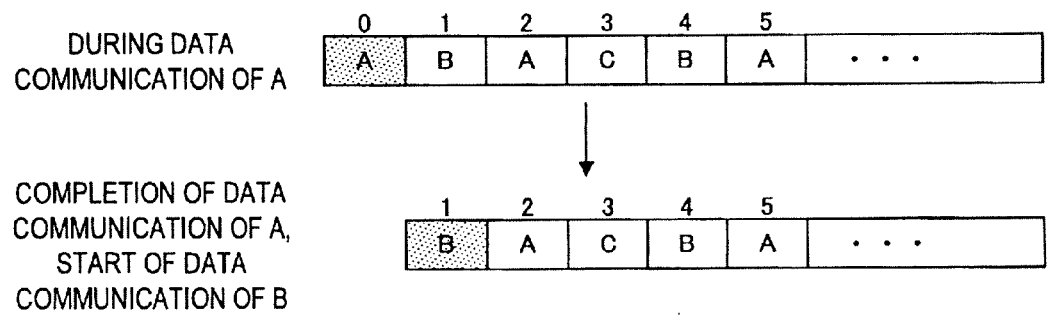
FIG. 6 is an explanatory view showing that data communication is performed according to a queuing number in a queue.

In this method, as shown in FIG. 6, when data communication of the content transmitting device 20A with the queuing number "0" is completed, data communication between the content transmitting device 20B with the queuing number "1" and the content receiving device 10 can be started without updating the queuing number.

(Transmission Signal Generation Unit 228)

The transmission signal generation unit 228 generates a transmission signal to be transmitted from the communication unit 216. For example, the transmission signal generation unit 228 generates a beacon frame (annunciation signal) that contains the queuing number managed by the order management unit 224. The structure of the beacon frame is described hereinafter with reference to FIG. 7.

Figure 7:
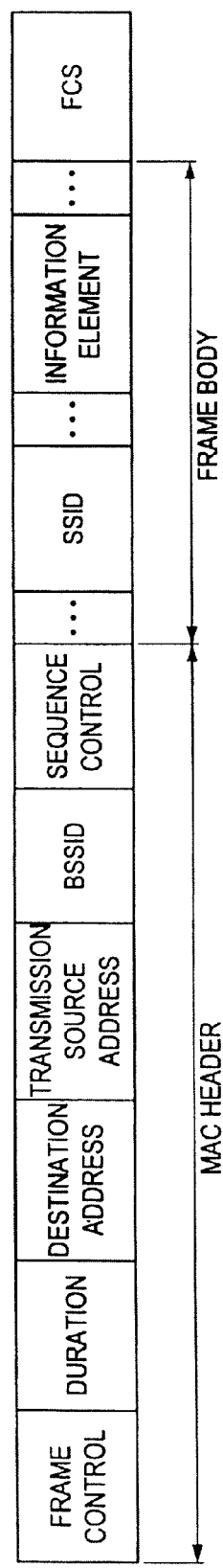
FIG. 7 is an explanatory view showing an exemplary structure of a beacon frame.

FIG. 7 is an explanatory view showing an exemplary structure of a beacon frame. As shown in FIG. 7, the beacon frame is composed of MAC header, Frame Body, and FCS (Frame Check Sequence). Further, the MAC header contains information such as frame control, duration, destination address (broadcast address), transmission source address, BSSID, and sequence control. The Frame Body contains information elements allowed to be defined as SSID (Service Set ID) or Vender-Specific IE and so on.

The transmission signal generation unit 228 may describe queuing numbers in the SSID in such a beacon frame. For example, the transmission signal generation unit 228 may describe "S-Music-0-2-5" where "S-Music" which is an identifier indicating a service is followed by queuing numbers as the SSID in the beacon frame. Alternatively, the transmission signal generation unit 228 may describe queuing numbers in the information element in the beacon frame.

Notifying the number at the front of the queue is important in selection of the device to communicate with the content receiving device 10, and notifying the number at the end of the queue is important for the content transmitting device 20 which asks for addition to the queue. On the other hand, notification of the other numbers is not essential.

In view of this, the transmission signal generation unit 228 may describe the number at the front and the number at the end among the queuing numbers of the content transmitting devices 20 rather than describing all the queuing numbers of the content transmitting devices 20. For example, when the content transmitting devices 20 has the queuing numbers "0, 2, 5", the transmission signal generation unit 228 may describe the information "S-Music-0-5". In this configuration, the overhead necessary for notification of the queuing number can be saved. Further, in the process of updating the queuing number as shown in FIG. 5, the transmission signal generation unit 228 of the content transmitting device 20A may describe the information "S-Music-(−1)-5" after completion of data communication of the content transmitting device 20A, and describe the information "S-Music-1-4" after update of the queuing numbers.

Further, when describing the queuing number in the information element, the transmission signal generation unit 228 may describe all the queuing numbers of the content transmitting device 20 in one information element or may describe only the numbers at the front and at the end in one information element. Furthermore, the transmission signal generation unit 228 may describe the respective queuing numbers in different information elements.

(Communication Control Unit 232)

The communication control unit 232 controls the overall communication by the content transmitting device 20. For example, the communication control unit 232 directs the transmission signal generation unit 228 to generate a transmission signal or controls the transmission processing by the communication unit 216.

Note that, if all the content transmitting devices 20 placed in the queue transmit the above-described beacon frame at prescribed intervals for notification of the queuing numbers, there is a concern that it causes a squeeze on the wireless band. In view of this, the communication control unit 232 may set a beacon interval to be always long or may set a beacon interval to be long according to the queuing number of its own device.

Figure 8:
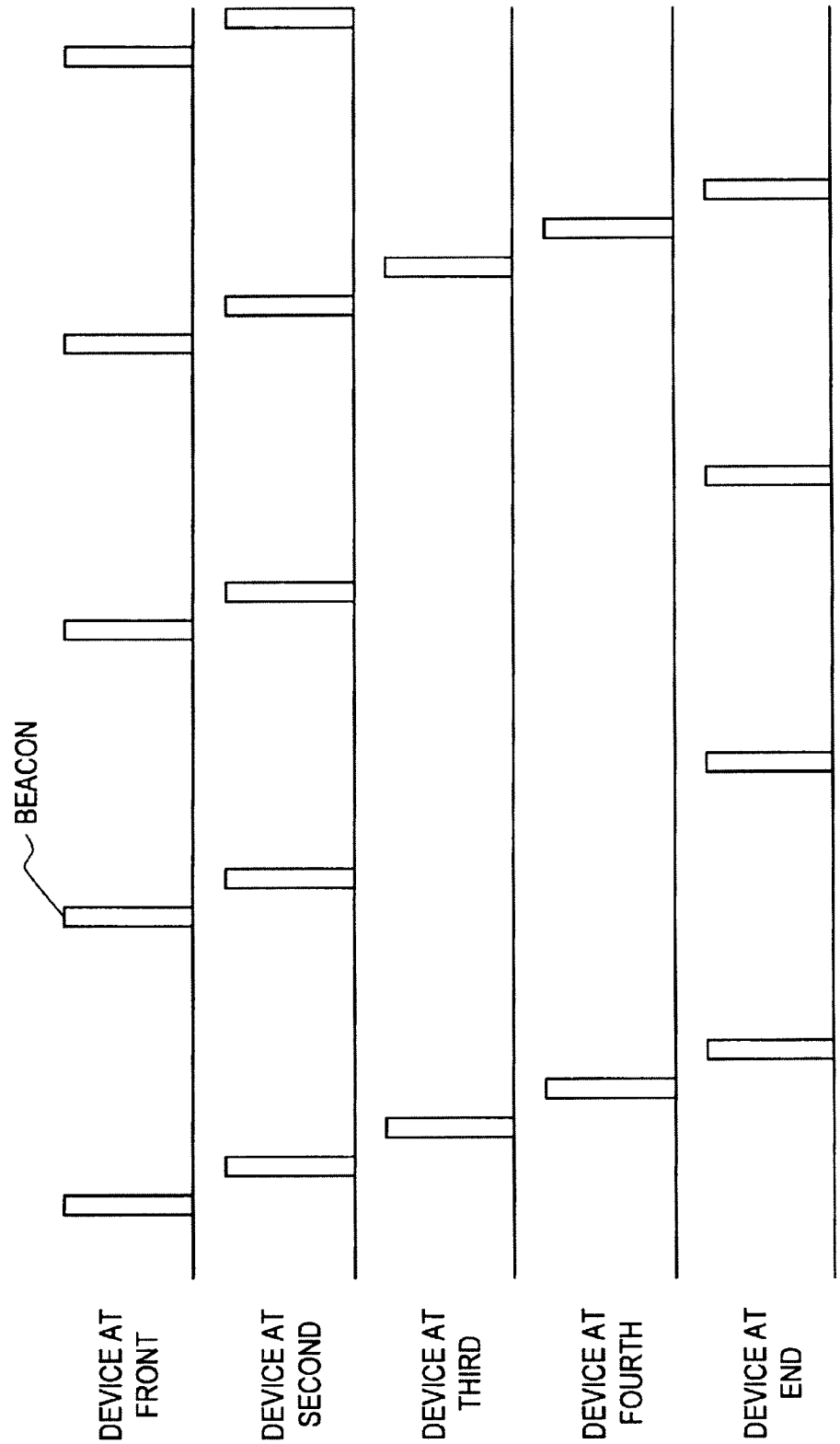
FIG. 8 is an explanatory view showing an example of adjusting a beacon interval according to a queuing number in a queue.

Specifically, because it is important to notify the numbers at the front and at the end of the queue as described above, the communication control unit 232 may use a normal beacon interval at the time when its own device has the queuing number at the front or at the end, and set the beacon interval to be longer or refrain from transmitting a beacon at the other times as shown in FIG. 8. In this configuration, it is possible to reduce the amount of power and wireless resources consumed as well as maintaining the normal operation of the wireless communication system 1.

Alternatively, the communication control unit 232 may transmit a beacon frame for notifying a queuing number by using a wireless channel different from the channel for data communication with the content receiving device 10. In this case, the queued content transmitting device 20 may identify the wireless channel used for data communication by detecting a beacon frame, a probe response or the like of the content transmitting device which is notifying the queuing number n at the front.

Alternatively, the communication control unit 232 may make the beacon timing coincide with the other content transmitting devices 20 in order to reduce the consumption of wireless resources. Alternatively, the communication control unit 232 may set the beacon transmission timing so as to avoid the timing of data communication based on the beacon frame of the content transmitting device 20 currently performing the data communication.

Further, the communication control unit 232 may stop beacon transmission when its own device is placed in the queue. In this case, the transmission signal generation unit 228 describes the queuing number in a probe response, which is a response to a probe request, to thereby notify the queuing number. This configuration enables further reduction of the amount of power and wireless resources consumed. Note that the transmission signal generation unit 228 may incorporate the information element indicating the queuing number of its own device into the probe response only when the probe request contains the information element which asks for the queuing number.

<3. Operation of Content Transmitting Device>

The configuration of the content transmitting device 20 is described above. Hereinafter, the operation of the content transmitting device 20 is described briefly with reference to FIG. 9.

Figure 9:
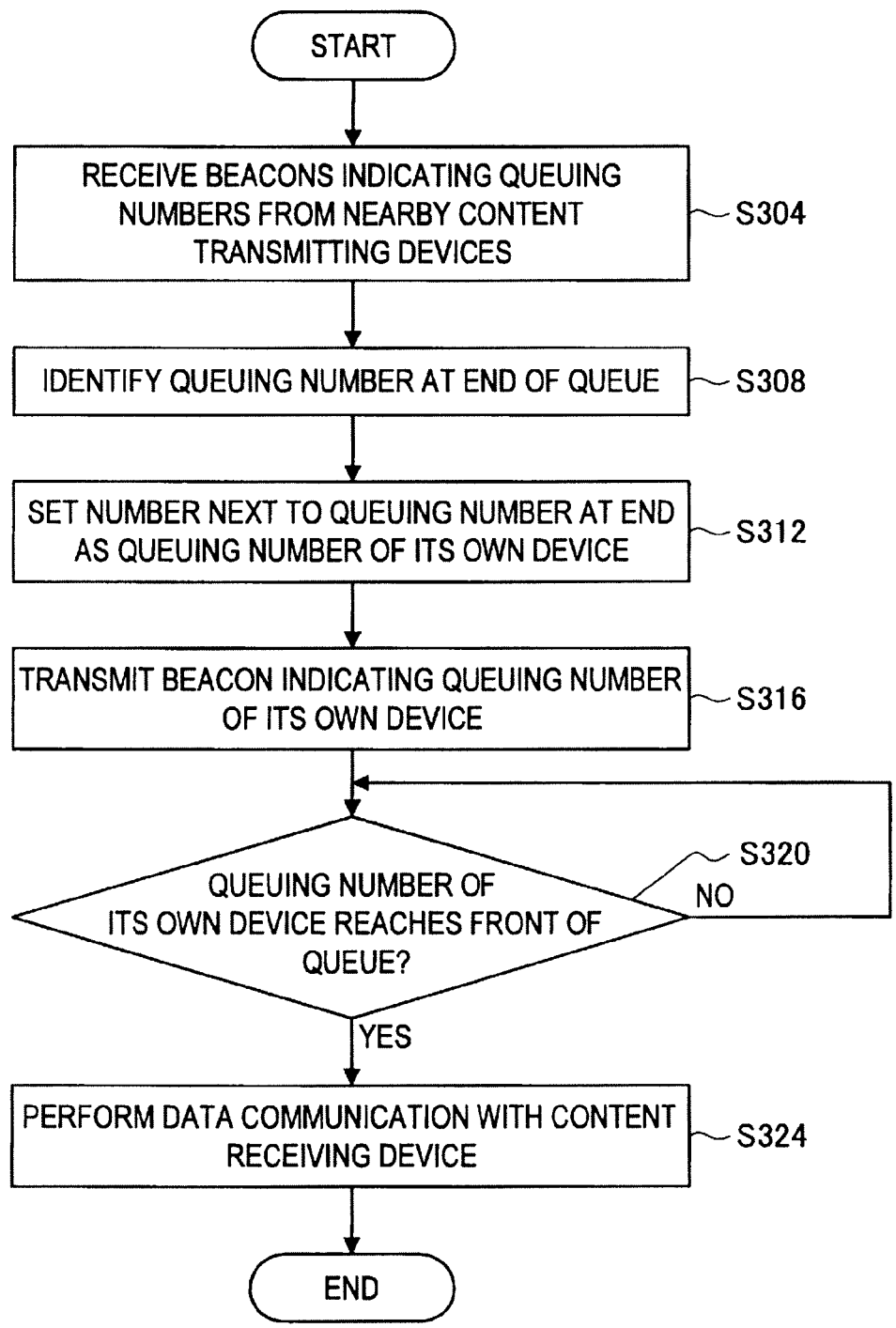
FIG. 9 is a flowchart showing an operation of a content transmitting device.

FIG. 9 is a flowchart showing the operation of the content transmitting device 20. The content transmitting device 20 which asks for addition to the queue first receives beacons indicating queuing numbers from the content transmitting devices in the vicinity (S304). Then, the order management unit 224 identifies the queuing number at the end of the queue (S308) and sets a number next to the queuing number at the end as the queuing number of its own device (S312).

Then, the transmission signal generation unit 228 generates a beacon frame in which the queuing number set by the order management unit 224 is described, and the communication unit 216 transmits the beacon frame based on control by the communication control unit 232 (S316). After that, the order management unit 224 updates the queuing number according to need, and, when the queuing number of its own device reaches the front of the queue (S320), the content transmitting device 20 starts data communication with the content receiving device 10 (S324).

<4. Configuration of Content Receiving Device>

The configuration and the operation of the content transmitting device 20 are described in the foregoing. In the following, the configuration of the content receiving device 10 is described with reference to FIG. 10.

Figure 10:
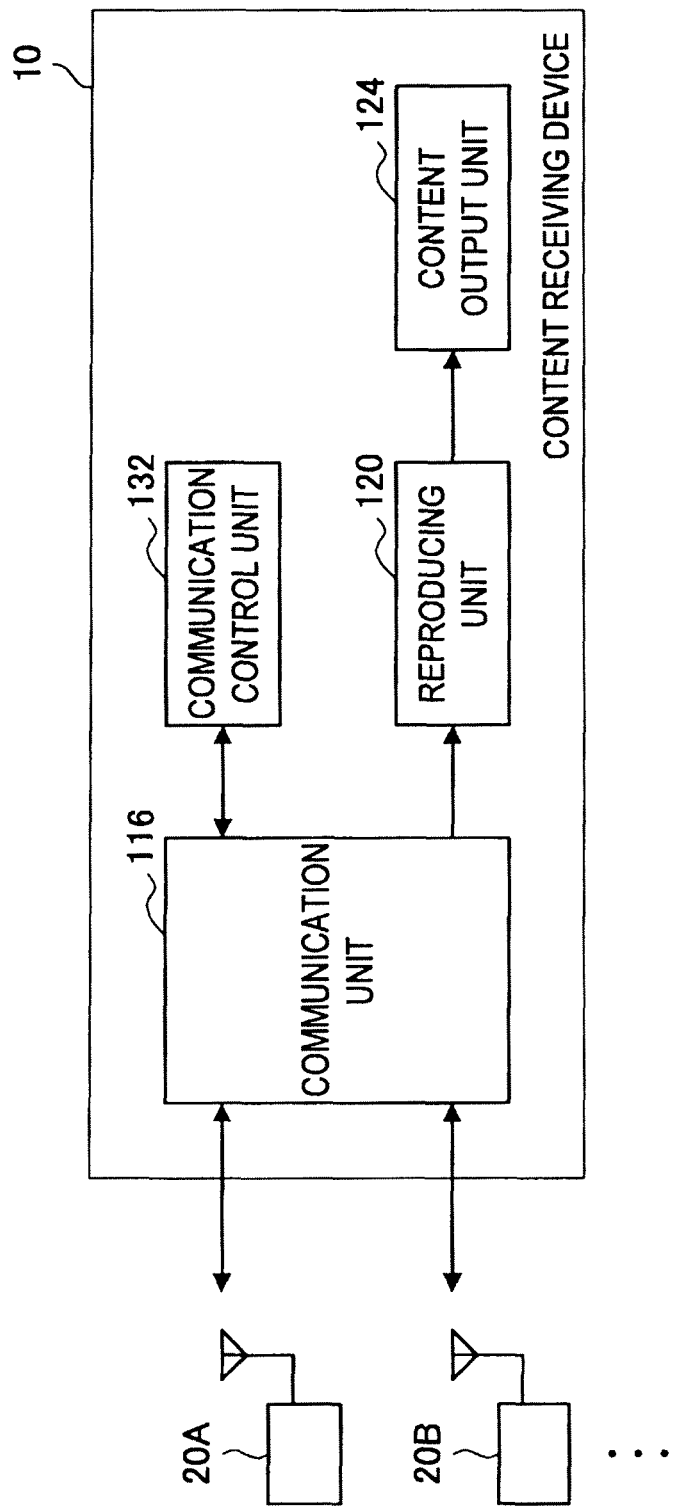
FIG. 10 is a functional block diagram showing a configuration of a content receiving device.

FIG. 10 is a functional block diagram showing the configuration of the content receiving device 10. Referring to FIG. 10, the content receiving device 10 includes a communication unit 116, a reproducing unit 120, a content output unit 124, and a communication control unit 132.

The communication unit 116 is an interface with the content transmitting device 20 and functions as a receiving unit that receives the beacon frame which contains information indicating the queuing number from the content transmitting device 20. Further, the communication unit 116 performs data communication with the content transmitting device 20 such as receiving content data from the content transmitting device 20.

The reproducing unit 120 reproduces the content data transmitted from the content transmitting device 20 and received by the communication unit 116 and supplies a reproduced signal to the content output unit 124. The reproducing unit 120 performs decoding, D/A conversion or the like of the content data, for example.

The content output unit 124 outputs the content based on the reproduced signal supplied from the reproducing unit 120. For example, when the content data transmitted from the content transmitting device 20 contains video data, the content output unit 124 displays the video data. Further, when the content data transmitted from the content transmitting device 20 contains voice data, the content output unit 124 converts the voice data into aerial vibration and outputs it.

The communication control unit 132 controls the overall communication by the content receiving device 10. For example, the communication control unit 132 selects the content transmitting device 20 with which data communication is to be performed with based on the information indicating the queuing numbers transmitted from each of the content transmitting devices 20 and received by the communication unit 216. Then, the communication control unit 132 transmits a request for data communication to the selected content transmitting device 20 from the communication unit 116. The data communication by the content receiving device 10 and the content transmitting device 20 is thereby started.

As described earlier with reference to FIG. 5, when each content transmitting device 20 advances the queuing number by one upon completion of the data communication, the communication control unit 132 selects the content transmitting device 20 with the queuing number "0" as the device to communicate with.

However, because of the hidden node problem in wireless communication, there is a possibility that a plurality of content transmitting devices 20 notify the identical queuing number at the same time. For example, referring to FIG. 1, when the content transmitting device 20C serves as a hidden node of the content transmitting device 20A, the content transmitting device 20C determines the number at the end of the queue as "4" and sets the queuing number of itself to "5", which overlaps with the content transmitting device 20A.

In view of this, when a plurality of content transmitting devices 20 notify the first queuing number "0" which is at the front of the queue, the communication control unit 132 may select one content transmitting device 20 from the plurality of content transmitting devices 20. A method of the selection may be random selection or selection according to a given criterion.

Alternatively, each of the content transmitting devices 20 may carry out the update of the queuing number to the first queuing number "0" based on a direction from the content receiving device 10. In this configuration, when a plurality of content transmitting devices 20 notify the second queuing number "1", the content receiving device 10 selects one content transmitting device 20 and directs the selected one to make update to the first queuing number "0". This prevents a plurality of content transmitting devices 20 from notifying the first queuing number "0".

On the other hand, there may be a case where the content transmitting device 20 placed in the queue does not exit. In view of this, an identifier "z" to be treated exceptionally may be prepared in advance, and, when the content transmitting device 20 that transmits information indicating a queuing number does not exit, the content receiving device 10 may search for the content transmitting device 20 that transmits the identifier "z" and perform data communication with the content transmitting device 20. Further, the identifier "z" may be transmitted in the same way as the queuing number or may be transmitted using a unique information element.

For example, a use case is assumed where a plurality of second users having the content transmitting devices 20 get together in the home of a first user having the content receiving device 10, and the respective content transmitting devices 20 are placed in the queue and sequentially transmit content data to the content receiving device 10. In this case, if the content transmitting device 20 of the first user is designed to transmit the identifier "z", the following operation is expected.

When the content transmitting device 20 of the second user placed in the queue exists The content receiving device 10 receives content data from the content transmitting device 20 of the second user placed at the front of the queue and reproduces the data.

When the content transmitting device 20 of the second user placed in the queue ceases to exist The content receiving device 10 receives content data from the content transmitting device 20 of the first user and reproduces the data.

<5. Exchange of Connection Information>

Although the above description is based on the assumption of the state where the content receiving device 10 and the content transmitting device 20 share connection information for making wireless connection, there may be a case where the content receiving device 10 and the content transmitting device 20 do not share the connection information. In this case, in wireless LAN, for example, it is possible to exchange the connection information by PBC (Push Button Configuration) of WPS (Wi-Fi Protected Setup). However, there is a possibility that connection with another wireless communication device is disconnected when performing the WPS.

Therefore, it is preferred to perform processing such as the WPS for sharing connection information at the time when the content receiving device 10 switches the device to communicate with, not during data communication of the content receiving device 10. However, it is not preferable in terms of convenience that timing when a user can perform trigger operation of the WPS is limited. In view of this, a sharing method of connection information which is described hereinafter with reference to FIG. 11 is proposed in the embodiment of the present invention.

FIG. 11 is a sequence chart showing a method of sharing connection information. Referring to FIG. 11, when the content transmitting device 20A notifies the queuing number at the front of the queue, the content receiving device 10 transmits a request for communication to the content transmitting device 20A (S404), and data communication between the content receiving device 10 and the content transmitting device 20A is started (S408).

After that, when push buttons of the content receiving device 10 and the content transmitting device 20D are pressed (S412), the content receiving device 10 transmits a probe request containing description of vendor-specific information to the content transmitting device 20D (S416). Note that the push button may be physically mounted on the content receiving device 10 and the content transmitting device 20D or may be displayed on a screen in a selectable manner. Further, the push button may be a WPS push button, for example, or another dedicated button. Furthermore, the user operation may be pressing of the push button and PIN input.

When the content transmitting device 20D receives the probe request from the content receiving device 10, it transmits a probe response containing description of vendor-specific information to the content receiving device 10 (S420).

Under normal conditions, communication for the content receiving device 10 and the content transmitting device 20D to share connection information is performed after that. However, because the content receiving device 10 is performing data communication with the content transmitting device 20A, the content receiving device 10 records the MAC address of the content transmitting device 20D which is described as the transmission source address of the probe response. Likewise, the content transmitting device 20D records the MAC address of the content receiving device 10 which is described as the transmission source address of the probe request.

Then, when upon completion of the data communication with the content transmitting device 20A (S424), the content receiving device 10 accesses the MAC address of the content transmitting device 20D and executes a protocol for exchanging wireless LAN setting such as the WPS (S428). The content receiving device 10 can thereby share connection information with the content transmitting device 20D without interrupting data communication.

After that, the content receiving device 10 transmits a request for communication to the content transmitting device 20B (S432), and data communication between the content receiving device 10 and the content transmitting device 20B is started (S436).

Note that a wireless channel through which the content receiving device 10 transmits a probe request may be a wireless channel which is used for data communication. In this case, if the content transmitting device 20D scans the surrounding environment in advance and identifies the wireless channel being used for data communication, it is possible to transmit and receive the probe request and the probe response in a short time.

<6. Summary>

As described above, in the wireless communication system 1 according to the embodiment of the present invention, each of the content transmitting devices 20 identifies the queuing numbers of themselves and transmits information indicating their respective queuing numbers to thereby add themselves to the queue for data communication with the content receiving device 10. Thus, in the wireless communication system 1 according to the embodiment of the present invention, it is not necessary for the content transmitting device 20 to perform communication with the content receiving device 10 at the time of adding itself to the queue, and therefore a new entry can be added to the queue without depending on the communication status of the content receiving device 10.

Therefore, the wireless communication system 1 according to the embodiment of the present invention can add a new entry to the queue without interrupting data communication of the content receiving device 10 and without waiting for completion of data communication of the content receiving device 10.

Further, the content transmitting device 20 may set a beacon interval to be long according to the queuing number of itself in the queue, thereby reducing the consumption of power and wireless band.

Although preferred embodiments of the present invention are described in detail above with reference to the appended drawings, the present invention is not limited thereto. It should be understood by those skilled in the art that various modifications, combinations, sub-combinations and alterations may occur depending on design requirements and other factors insofar as they are within the scope of the appended claims or the equivalents thereof.

Further, it is not always necessary to perform the steps in the processing of the wireless communication system 1 and the content transmitting device 20 of the specification in chronological order according to the sequence shown in sequence charts or flowcharts. For example, the steps in the processing of the wireless communication system 1 and the content transmitting device 20 may be processed in a difference sequence from the sequence shown in sequence charts or flowcharts or may be processed in parallel.

Furthermore, it is possible to create a computer program that causes hardware such as the CPU 201, the ROM 202 and the RAM 203 incorporated in the wireless communication system 1 and the content transmitting device 20 to perform the equal functions to the elements of the wireless communication system 1 and the content transmitting device 20 described above. Further, a storage medium that stores such a computer program may be provided.

The present application contains subject matter related to that disclosed in Japanese Priority Patent Application JP 2010-026430 filed in the Japan Patent Office on Feb. 9, 2010, the entire content of which is hereby incorporated by reference.

What is claimed is:

1. A wireless communication device comprising:
   a receiving unit operable to receive, from one or more first wireless communication devices, information indicating an order of each of the one or more first wireless communication devices in a queue for data communication with a second wireless communication device;
   an order management unit operable to manage an order of the wireless communication device in the queue based on the information received from the one or more first wireless communication devices, wherein when adding the wireless communication device to the queue, the order management unit of the wireless communication device sets the order of the wireless communication device next to an order at an end of the queue; and
   a transmitting unit operable to transmit to the one or more first wireless communication devices, information indicating the order of the wireless communication device in the queue, wherein the transmitted information indicates a first order and a last order among a plurality of orders of the wireless communication device in the queue.

2. The wireless communication device according to claim 1, wherein the wireless communication device starts data communication with the second wireless communication device when the order of the wireless communication device in the queue reaches a front of the queue.

3. The wireless communication device according to claim 2, wherein the information indicating the order of the wireless communication device in the queue is contained in an annunciation signal transmitted periodically.

4. The wireless communication device according to claim 3, wherein the transmitting unit transmits the annunciation signal at an interval according to the order of the wireless communication device in the queue.

5. The wireless communication device according to claim 4, wherein the transmitting unit transmits the information indicating the order of the wireless communication device in the queue through a wireless channel different from a wireless channel for data communication with the second wireless communication device.

6. The wireless communication device according to claim 1, wherein the transmitting unit transmits the information indicating the order of the wireless communication device in the queue in response to a request from another wireless communication device.

7. The wireless communication device according to claim 1, wherein the order management unit is operable to update the order of the wireless communication device in the queue after completion of data communication with the second wireless communication device.

8. A wireless communication device comprising:
   a receiving unit that receives, from a plurality of wireless communication devices, information indicating an order of each of the plurality of wireless communication devices in a queue for data communication with the wireless communication device,
   wherein each of the plurality of wireless communication devices is operable to:
      receive from other of the plurality of wireless communication devices, information indicating an order of the plurality of wireless communication devices in a queue for data communication with the wireless communication device, wherein the received information indicates a first order and a last order among a plurality of orders of each of the plurality of wireless communication devices in the queue; and
      manage an order of a corresponding wireless communication device of the plurality of wireless communication devices in the queue based on the information received from the other of the plurality of wireless communication devices,
   wherein when the corresponding wireless communication device is added to the queue, the corresponding wireless communication device sets the order of the wireless communication device next to an order at an end of the queue,
   wherein the wireless communication device starts data communication with one of the plurality of wireless communication devices having an order at a front of the queue among the plurality of wireless communication devices based on the information received by the receiving unit.

9. A wireless communication system comprising:
   a plurality of first wireless communication devices; and
   a second wireless communication device, wherein each of the plurality of first wireless communication devices is operable to:
      receive, from other of the plurality of first wireless communication devices, information indicating an order of each of the plurality of first wireless communication devices in a queue for data communication with the second wireless communication device;
      manage an order of a corresponding first wireless communication device of the plurality of first wireless communication devices in the queue based on the information received from the other of the plurality of first wireless communication devices; and
      transmit to each of the plurality of first wireless communication devices information indicating the order of the corresponding first wireless communication device in the queue, wherein the transmitted information indicates a first order and a last order among a plurality of orders of the corresponding first wireless communication device in the queue,
   wherein the second wireless communication device is operable to select a first wireless communication device from the plurality of first wireless communication devices based on the order of the first wireless communication device in the queue,
   wherein the second wireless communication device starts data communication with one of the plurality of first wireless communication devices having the order at a front of the queue among the plurality of first wireless communication devices based on the received information.

10. The wireless communication system according to claim 9, wherein the second wireless communication device executes exchange of connection information with a new wireless communication device upon switching of communication to another of the plurality of the first wireless communication devices.

11. The wireless communication system according to claim 9, wherein the second wireless communication device is operable to select one of the plurality of first wireless communication devices based on the order of each of the first wireless communication devices in the queue.

12. The wireless communication system according to claim 9, wherein the second wireless communication device is operable to select one of the plurality of first wireless communication devices when one or more of the plurality of the first wireless communication devices notifies the same order in the queue.

13. The wireless communication system according to claim 9, wherein each of the plurality of first wireless communication devices is added to the queue next to an order at an end of the queue.

14. The wireless communication system according to claim 9, wherein each of the plurality of first wireless communication devices is operable to update the order of the corresponding first wireless communication device in the queue when a request for addition into the queue is transmitted by the other of the plurality of the first wireless communication devices.

15. The wireless communication system according to claim 9, wherein the second wireless communication device is operable to select one of the plurality of the first wireless communication devices when the plurality of the first wireless communication devices notifies the same order in the queue.

16. The wireless communication system according to claim 9, wherein the information indicating the order of the first wireless communication device in the queue is transmitted through a wireless channel different from a wireless channel for data communication with the second wireless communication device.

17. A non-transitory computer-readable storage medium having stored thereon, a computer program having at least one code section for communication, the at least one code section being executable by a computer for causing the computer to perform steps comprising:
   receiving from a plurality of first wireless communication devices, information indicating an order of the plurality of first wireless communication devices in a queue for data communication with a second wireless communication device;
   managing an order of a corresponding first wireless communication device of the plurality of first wireless communication devices in the queue based on the information received from the plurality of first wireless communication devices, wherein when the corresponding first wireless communication device is added to the queue, the corresponding first wireless communication device sets the order of the corresponding first wireless communication device next to an order at an end of the queue; and
   transmitting to each of the plurality of first wireless communication devices information indicating the order of the corresponding first wireless communication device in the queue, wherein the transmitted information indicates a first order and a last order among a plurality of order of the corresponding first wireless communication device in the queue.

18. A wireless communication method comprising:
   in a wireless communication device:
   receiving, from a plurality of first wireless communication devices, information indicating an order of each of the plurality of first wireless communication devices in a queue for data communication with a second wireless communication device;
   managing an order of the wireless communication device in the queue based on the information received from the plurality of first wireless communication devices, wherein when the first wireless communication device is added to the queue, the wireless communication device sets the order of the wireless communication device next to an order at an end of the queue; and
   transmitting to each of the plurality of first wireless communication devices information indicating the order of the wireless communication device in the queue, wherein the transmitted information indicates a first order and a last order among a plurality of orders of the wireless communication device in the queue.

* * * * *